May 14, 1968     P. W. DILLON ET AL     3,383,450
ELECTRIC MELT VESSEL HAVING MEANS FOR REDUCING
COLD SPOT AREAS THEREIN
Original Filed Nov. 23, 1964

INVENTOR.
Paul W. Dillon
Charles G. Robinson
BY
Hill, Sherman, Meroni, Gross & Simpson
ATTORNEYS 
United States Patent Office 3,383,450
Patented May 14, 1968

---

3,383,450
ELECTRIC MELT VESSEL HAVING MEANS FOR REDUCING COLD SPOT AREAS THEREIN
Paul W. Dillon and Charles G. Robinson, Sterling, Ill., assignors to Northwestern Steel & Wire Company, Sterling, Ill., a corporation of Illinois
Original application Nov. 23, 1964, Ser. No. 413,264. Divided and this application May 24, 1967, Ser. No. 651,079
3 Claims. (Cl. 13—9)

ABSTRACT OF THE DISCLOSURE

Direct arc electric melting vessel having multiple electrodes leading through the roof of the vessel, to a position adjacent the melting zone of the vessel, in which the heat balance within the melting vessel is equalized by recessing current conducting blocks in the refractory lining of the melting vessel, along the cylindrical wall portion of the vessel in the cold spot areas of the vessel between the electrodes. The rows of current conducting blocks are each connected to a single phase of a multi-phase transformer. The current conducting blocks may be energized independently of or simultaneously with energization of the electrodes.

Summary and objects of the invention

This application is a division of our parent application Ser. No. 413,264, filed Nov. 23, 1964.

This invention relates to improvements in electric melting vessels.

A principal object of the present invention is to provide a novel and improved form of electric melting vessel arranged with a view toward utmost efficiency in the liquidfying and melting of metals of various types.

Another object of the invention is to improve upon the direct arc electric furnaces heretofore in use by controlling the heat balance within the furnace, by recessing blocks made from carbon compounds in the wall of the furnace and locating the blocks in the cold spots of the furnace and energizing the blocks through a multi-phase source of current.

A still further object of the invention is to equalize the heat balance within a direct arc multi-electrode electric melting vessel, by recessing vertical rows of carbon compound blocks in the cylindrical wall of the vessel in each cold spot area of the furnace in the spaces between the electrodes, and by energizing each row of carbon compound blocks through a single phase of the multi-phase transformer, independently of energization of the electrodes.

Figure 1:
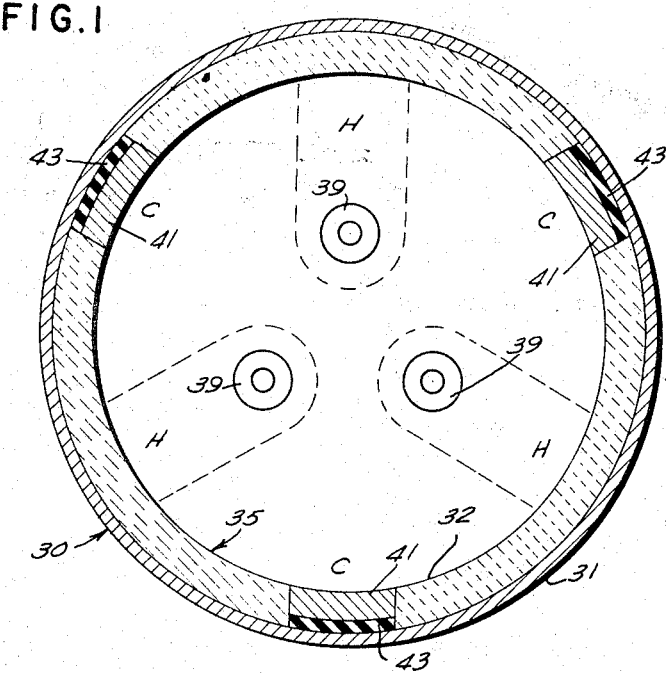
Figure 2:
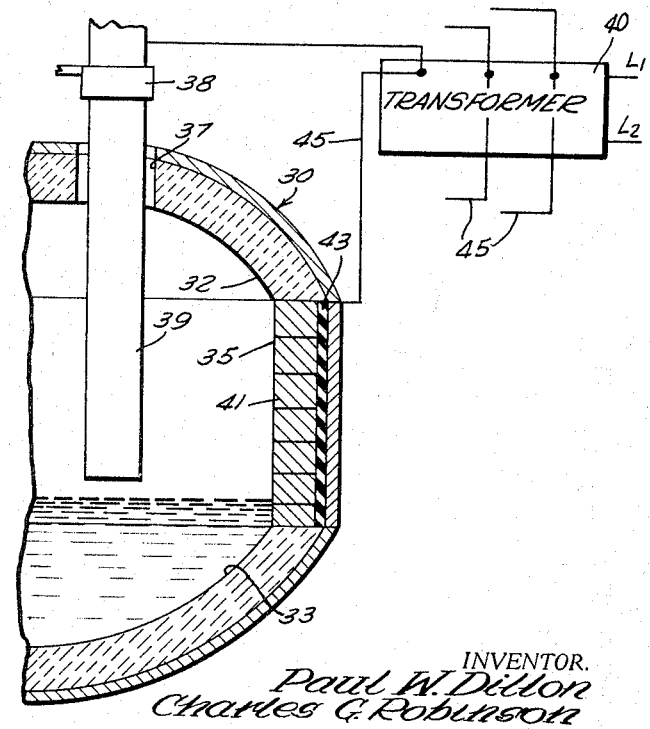

These and other objects of the invention will appear from time to time as the following specification proceeds and with reference to the accompanying drawings wherein:

FIGURE 1 is a horizontal sectional view taken through a conventional form of three-phase electric furnace, showing the principles of the present invention applied to the furnace, to equalize the heat balance within the furnace; and FIGURE 2 is an enlarged fragmentary diagrammatic vertical sectional view taken through a conventional three-phase electric furnace, in order to further illustrate the application of the principles of the present invention to improve the heat balance within the furnace.

The principles of the present invention are applicable to various forms of vessels for melting ferrous and non-ferrous metals and are applicable to reheat furnaces, melting vessels for scrap and other metals as well as conventional three-phase electric furnaces, and are particularly applicable to melting vessels for scrap and ferrous and non-ferrous metals, but may be applied as well to improve the heat balance of conventional three-phase electric furnaces.

In FIGURES 1 and 2 we have shown the principles of the invention applied to balance the unbalanced heat of a conventional three-phase electric furnace. The furnace is generally indicated by reference character 30 and is conventionally in the form of a steel bowl or shell 31 with a refractory lining such as is shown at 32. The furnace 30 has a hearth 33 which is in the form of a shallow bowl formed in the refractory of the bottom lining and has a generally cylindrical side wall 35 extending upwardly from the hearth 33 and terminating into a roof, apertured at 37 to form port openings through which vertical carbon or graphite electrodes 39 extend.

The electrodes 39 may be generally cylindrical columns of graphite or carbon and may be hollow or solid, such electrodes, however, usually being hollow, as shown.

Each electrode 39 is carried in a holder 39 (FIGURE 2) which may be mounted on the outside of the furnace for adjustable movement, to space the ends of the electrodes in the proper spaced relation with respect to the melt in the furnace. The holder 38 may be vertically moved by a winch and rope system, motor driven, or may be actuated by any other form of automatic electrode advancing mechanism. The holder and method of vertically moving the holder for properly positioning the electrodes 39 with respect to the charge is no part of the present invention, so need not herein be shown or described further.

The electrodes 39 are energized by a conventional electrical circuit means such as a transformer 40, which may be a three-phase transformer having a wide voltage range. One phase of the transformer may be connected with each electrode.

In FIGURE 1 of the drawing we have generally designated the approximate geometry of the hot spot areas in the furnace and have designated three areas by reference character H. Between the areas H are cold spot areas C, particularly along the lining of the furnace. In order to balance the heat in the furnace and eliminate these cold spot areas, we have recessed current conducting blocks 41 in the refractory lining of the furnace along the cylindrical wall portion 35 thereof, and have insulated the current conducting blocks from the shell of the furnace by suitable insulation 43. The current conducting blocks 41 may be carbon or graphite blocks and may extend downwardly along the wall of the furnace to the charge and are energized through leads 45 connected thereto at their upper ends. The leads 45 each connected to a single phase of the three-phase multi-voltage transformer 40 and may be connected to the same taps as the leads connected to the electrodes 39 or to different taps in accordance with voltage requirements to equalize the heat balance within the furnace, it being understood that the leads are placed in a triangular configuration to reduce the amount of reactance inherent from the transformer.

The carbon compound blocks 41 will thus increase the heat of the charge in the cold spot areas of the furnace, and more evenly balance the heat between the hot spot areas H and the cold spot areas C, with a resultant increase in the efficiency of the furnace.

It should here be understood that the carbon blocks 41 may be energized independently of the electrodes 39, where it is desired to maintain a constant heat in the furnace and maintain the charge of the melt condition as well as to preheat the furnace prior to the energization of the electrodes 39.

While we have herein shown and described one form in which our invention may be embodied, it may readily be understood that various modifications and variations in the invention may be attained without departing from the spirit and scope of the novel concepts thereof.

We claim as our invention:

1. In an electric melting furnace,
a melting vessel having a roof,
a generally cylindrical wall extending downwardly therefrom,
and a bowl forming the bottom thereof,
at least three electrodes arranged in triangular configuration extending downwardly through said roof, each being in the form of a column of a carbon compound,
a multi-phase source of power,
energizing circuits from said source of power, connecting each electrode to one phase of the multi-phase source of power,
said melting vessel having a refractory lining,
cold spot areas being formed in the region of the cylindrical wall of the vessel in the process between said electrodes and means recessed within said lining and insulated from said vessel and located in the cold spot areas of the furnace and each connected with one phase of the multi-phase source of current comprising,
blocks made from carbon compounds, recessed in the refractory lining of the furnace and extending downwardly therealong in the cold spot areas of the furnace and insulated from the shell of the furnace,
and electrical connections from said multi-phase source of power to said blocks connecting a single-phase of the multi-phase source to each block and placed in a triangular configuration, to reduce the reactance inherent from the multi-phase source of power.

2. In an electrical melting furnace,
a melting vessel having a roof and a generally cylindrical wall depending therefrom,
at least three electrodes leading through the roof of the vessel to a position adjacent the melting zone in the vessel and equally spaced in the melting zone and being in the form of graphite columns,
a multi-phase transformer,
energizing circuits from said transformer to said electrodes forming and maintaining confined arc zones between the tips of said electrodes and a charge within the furnace,
cold spot areas being formed in the region of the cylindrical wall of the vessel in the spaces between said electrodes and means equalizing the heat balance within the furnace and reducing the cold spot areas therein comprising
a vertical row of carbon compound blocks extending upwardly along the wall of the furnace in each cold spot area of the furnace in the space between the electrodes.
and energizing circuits to said carbon compound blocks from the multi-phase transformer, including leads leading from each phase of the transformer to said blocks.

3. In an electric melting furnace,
a melting vessel having a roof
a generally cylindrical wall depending therefrom and a bowl at the bottom thereof,
refractory linings for said roof, wall and bowl,
at least three electrodes leading through the roof of the vessel to positions adjacent a melting zone in the vessel and equally spaced about the melting zone and being in the form of graphite columns,
single-phase energizing circuits to said electrodes leading from a multi-phase source of power to form and maintain confined arc zones between the tips of said electrodes and the charge within the furnace,
the areas about said electrodes leading to the wall of the furnace forming hot zones,
cold zones along the wall of said furnace in the spaces between said hot zones,
and means for equalizing the heat balance with the furnace comprising
current conducting carbon compound blocks recessed within the wall of said furnace and extending upwardly along the wall of the furnace from said melting zone and insulated from the furnace shell,
and single-phase energizing circuits to said blocks leading from a multi-phase source of power.

References Cited

UNITED STATES PATENTS 3,264,094  8/1966  Robinson _____ 13—9 XR
3,164,657  1/1965  Shaw et al. _____ 13—9

ROBERT K. SCHAEFER, *Primary Examiner.*

M. GINSBURG, *Assistant Examiner.*